(12) United States Patent
Liu

(10) Patent No.: US 7,259,659 B2
(45) Date of Patent: Aug. 21, 2007

(54) MOTORCAR BURGLARPROOF SYSTEM

(75) Inventor: Fu-Jen Liu, Gueishan Township, Taoyuan County (TW)

(73) Assignees: Pin Liu Hung, Taipei (TW); Cheng Lin Kun, Keelung (TW)

( * ) Notice: Subject to any disclaimer, the term of this patent is extended or adjusted under 35 U.S.C. 154(b) by 248 days.

(21) Appl. No.: 11/147,283

(22) Filed: Jun. 8, 2005

(65) Prior Publication Data

US 2007/0001829 A1  Jan. 4, 2007

(51) Int. Cl.
*B60R 25/10* (2006.01)
*B60Q 1/00* (2006.01)

(52) U.S. Cl. .............................. 340/426.31; 340/425.5; 340/426.1; 307/10.2

(58) Field of Classification Search ............ 340/426.31
See application file for complete search history.

(56) References Cited

U.S. PATENT DOCUMENTS

| | | | | |
|---|---|---|---|---|
| 5,812,067 | A * | 9/1998 | Bergholz et al. ............ 340/5.52 |
| 6,252,978 | B1 * | 6/2001 | Grantz ........................ 382/118 |
| 7,110,570 | B1 * | 9/2006 | Berenz et al. ............... 382/104 |
| 2002/0097145 | A1 * | 7/2002 | Tumey et al. ................ 340/426 |
| 2006/0076834 | A1 * | 4/2006 | Kamiya ...................... 307/10.1 |
| 2006/0261931 | A1 * | 11/2006 | Cheng ..................... 340/426.1 |

* cited by examiner

*Primary Examiner*—Donnie L. Crosland
(74) *Attorney, Agent, or Firm*—Troxell Law Office, PLLC

(57) ABSTRACT

A motorcar burglar proof system comprised of a mechanism to lock up the steering wheel, an image retrieve device, and a built in control circuit; an IC chip integrated by the control circuit recording physical features of the genuine driver to compare with the image retrieved so to release the steering wheel if fits; if not, the steering wheel remaining to be locked up, the image being saved, and the alarm being activated to alert the parties concerned to respond in time.

10 Claims, 5 Drawing Sheets

MOTORCAR BURGLARPROOF SYSTEM

BACKGROUND OF THE INVENTION (a) Field of the Invention

The present invention is related to a motorcar burglar proof system mounted to the steering wheel, and more particularly, to one performs physical ID of the driver, locks up the steering wheel, sounds the alarm, and retrieves the image of the burglar in providing an active burglar proof function.

(b) Description of the Prior Art

Generally, the door lock for a motorcar is the basic equipment to prevent burglar form entering into the motorcar. The shame is that practically all the door locks no matter how advanced and sophisticated, installed by the genuine motor makers can be easily opened up by the burglar; and even they do stop the burglar, the burglar could break up the window and get into the car. This fact alone warrants the installation of a secondary burglar proof system.

To keep the motorcar on the road, it takes the running engine and the steering wheel to control the motorcar driving in the correct direction. Therefore, many burglar proof systems generally available in the market are essentially designed to lock up the steering wheel while the motorcar is parked. However, all these systems are limited to a mechanical locking system to restrict the turning of the steering wheel; once the mechanical structure to restrict the steering wheel is tempered, the motorcar could still be easily stolen.

SUMMARY OF THE INVENTION

The primary purpose of the present invention is to provide a motorcar burglar proof system essentially comprised of a frame adapted with a locking member to restrict the steering wheel, an image retrieve device, and a control circuit linked to the alarm mounted to the motorcar and integrated with power supply loop, IC chip, image recording unit, digital image process loop, locking member drive loop and alarm drive loop. The IC chip records the physical features of the genuine driver with the data to be compared with that of the image taken by the image retrieve device. If the comparison results fit, the locking member is released from the steering wheel; if not, the steering wheel remains locked, the image taken is filed, and the alarm is activated for the parties concerned to take action.

The control circuit may be further integrated with a radio communication module to transmit the image taken by the image retrieve device to the cellular phone of the owner of the motor car and/or to the main frame at a security company to read the image of the burglar and the status of the tempered door of the motorcar for taking the proper response at the first time.

DETAILED DESCRIPTION OF THE PREFERRED EMBODIMENTS

Figure 1:
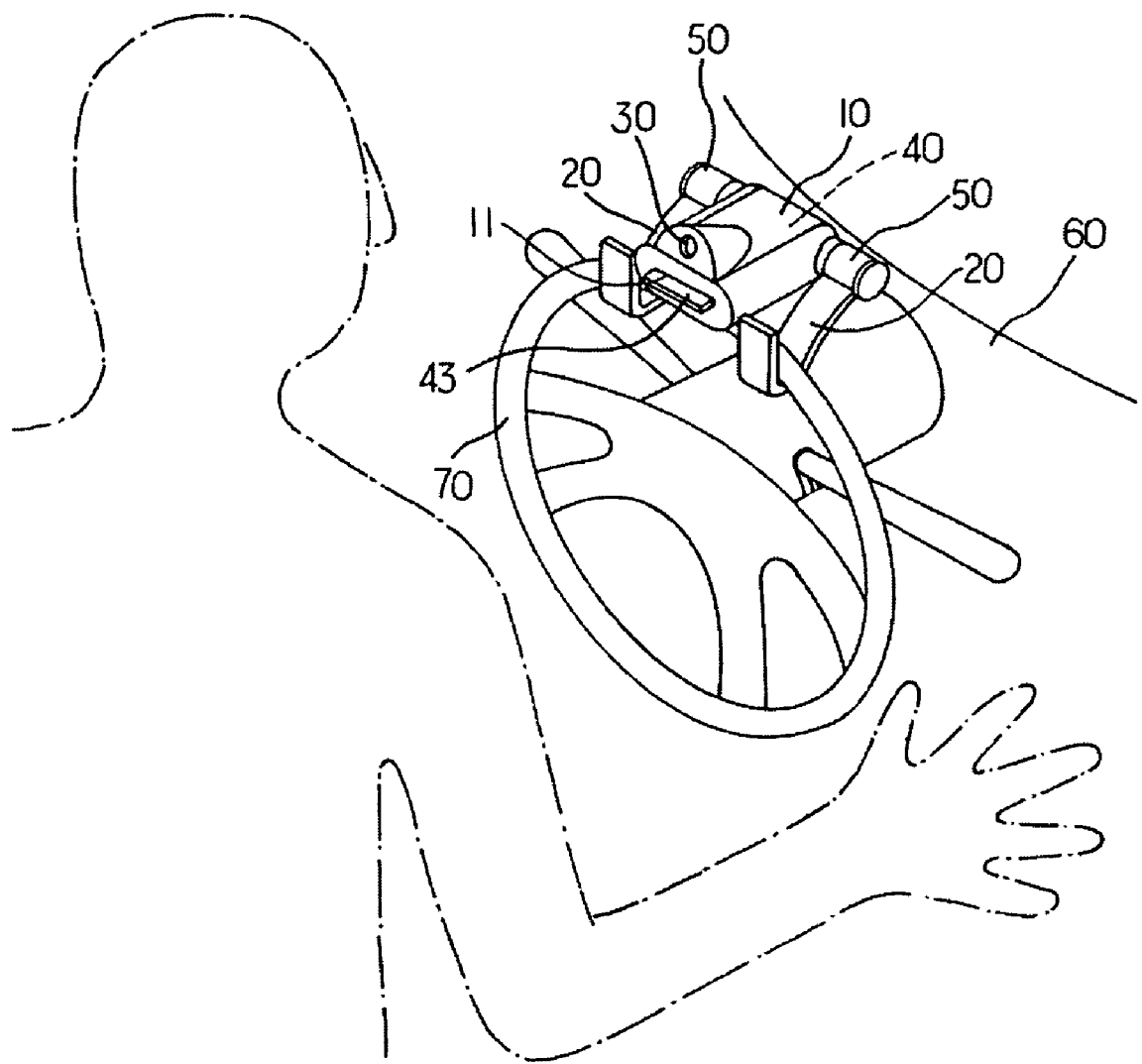
FIG. 1 is a perspective view of the present invention.
Figure 2:
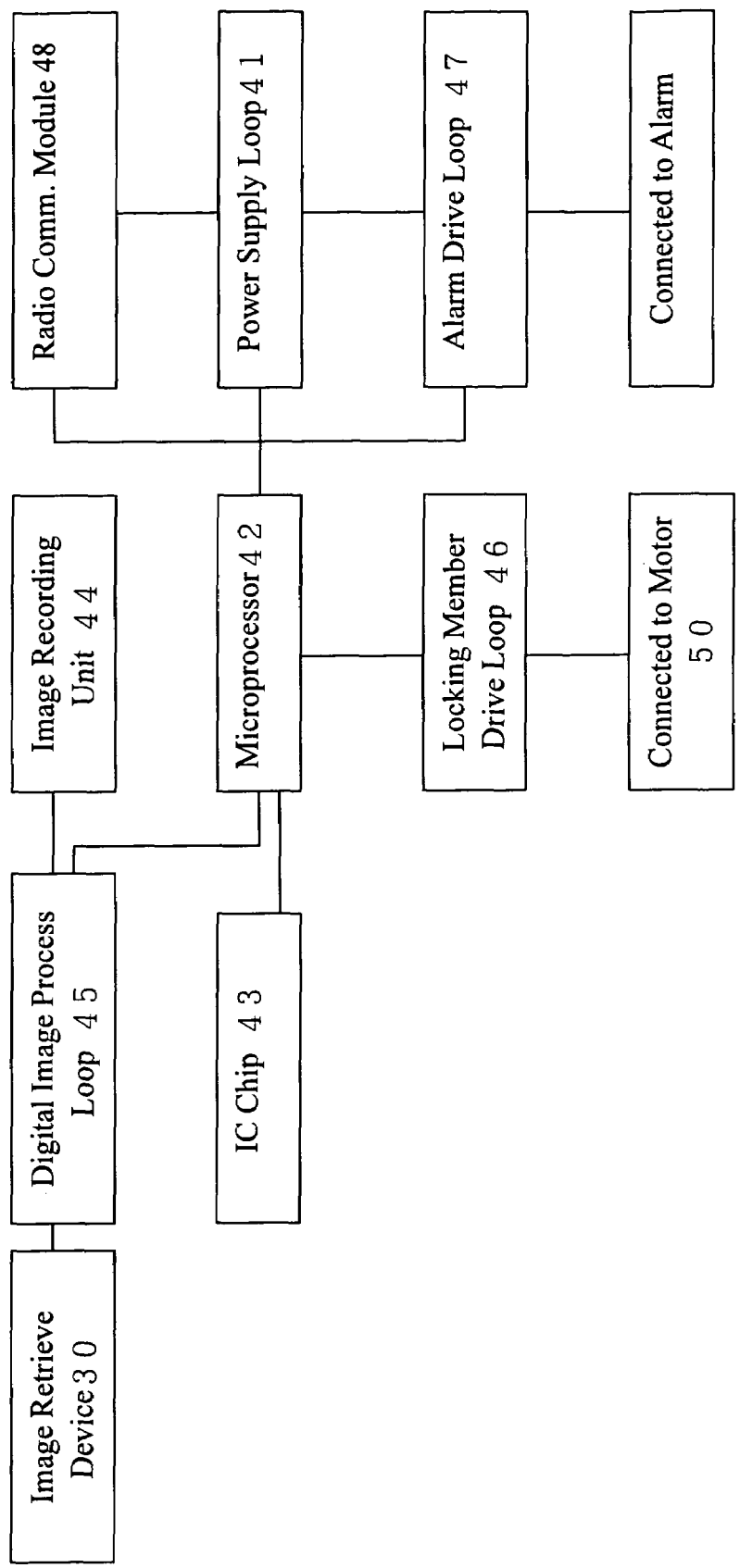
FIG. 2(A) is a block chart showing a configuration of the control circuit in the present invention.
FIG. 2(B) is a block chart showing another configuration of the control circuit in the present invention.
Figure 2:
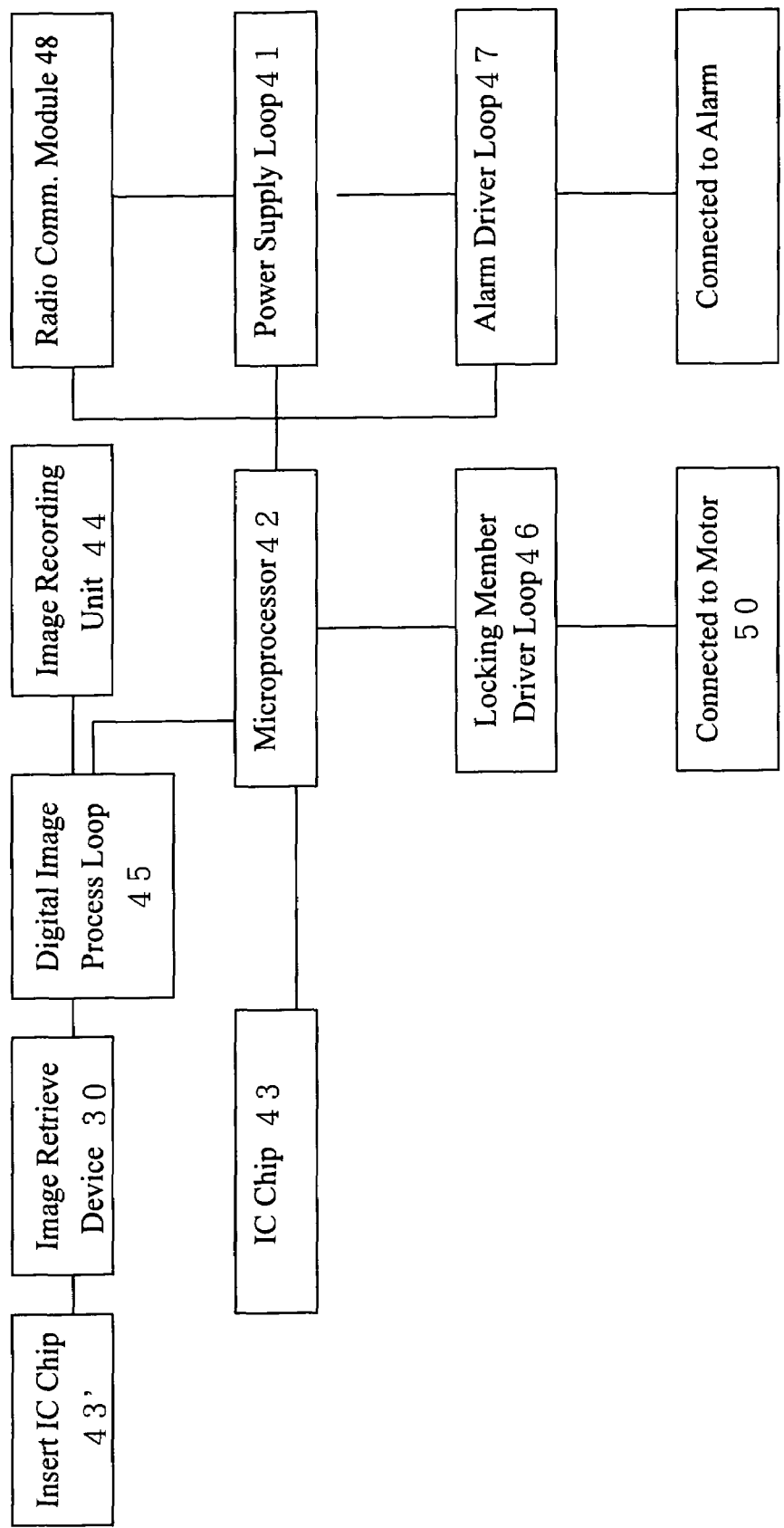

Referring to FIGS. 1 and FIG. 2(A), a preferred embodiment of the present invention is essentially comprised of a frame 10 adapted with a locking member 20 to restrict a steering wheel 70, an image retrieve device 30 (in the form of CCD, CMOS photo-sense device, digital image retrieve device or analog image retrieve device), a control circuit 41 built in the frame 10 integrated with a power supply loop 41, a microprocessor 42, an IC chip 43, an image recording unit 44, a digital image process loop 45, a locking member drive loop 46, an alarm drive loop 47, and a radio communication module 48. The control circuit 40 is further connected to an alarm (not illustrated) mounted to the motorcar.

Figure 3:
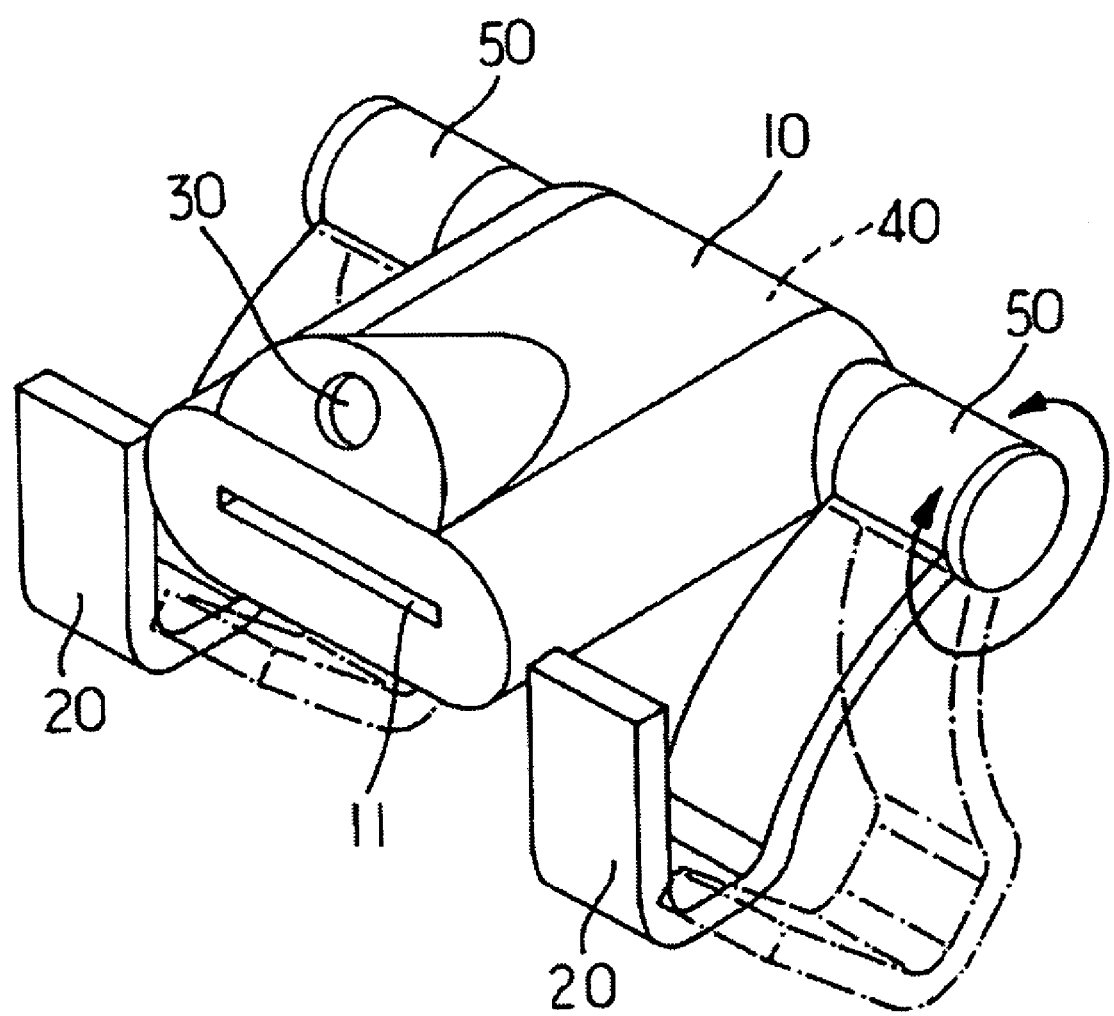
FIG. 3 is a schematic view showing the action of the locking member in the present invention.

Two motors 50 subject to the control by the locking member drive loop 46 and also integrated with the control circuit 40 are respectively provided on both sides of the frame 10. The locking member 20 is related to a clamping device with its angle changeable by being subject to the revolution of the motor 50 as illustrated in FIG. 3. In use, the frame 10 is fixed to an instrument panel 60 at where close to a steering wheel 70. Before the burglarproof system is activated, the locking member 50 is located with an angle not yet locking up the steering wheel 70.

Once the burglarproof system is activated after the owner leaves his motorcar and if the door is opened, the system operates as illustrated in the block chart of FIG. 2(A). The image retrieve device 30 is immediately activated to take the image in the direction of the driver's seat. The image taken is then compared to that of the physical features of the genuine driver recorded in the IC chip 43. If the comparison results fit, the motor is activated to release the locking member 20 from the steering wheel 70 for the motorcar to enter into the normal stand-by status. On the contrary, if the comparison results do not fit, the steering wheel 70 remains to be restricted by the locking member 20 while the image of the person sitting in the driver's seat is recorded and saved in the image recording unit 44 comprised of flash memory, burner and hard disk. Meanwhile, the alarm is activated to notify parties concerned for taking responses in time.

Figure 4:
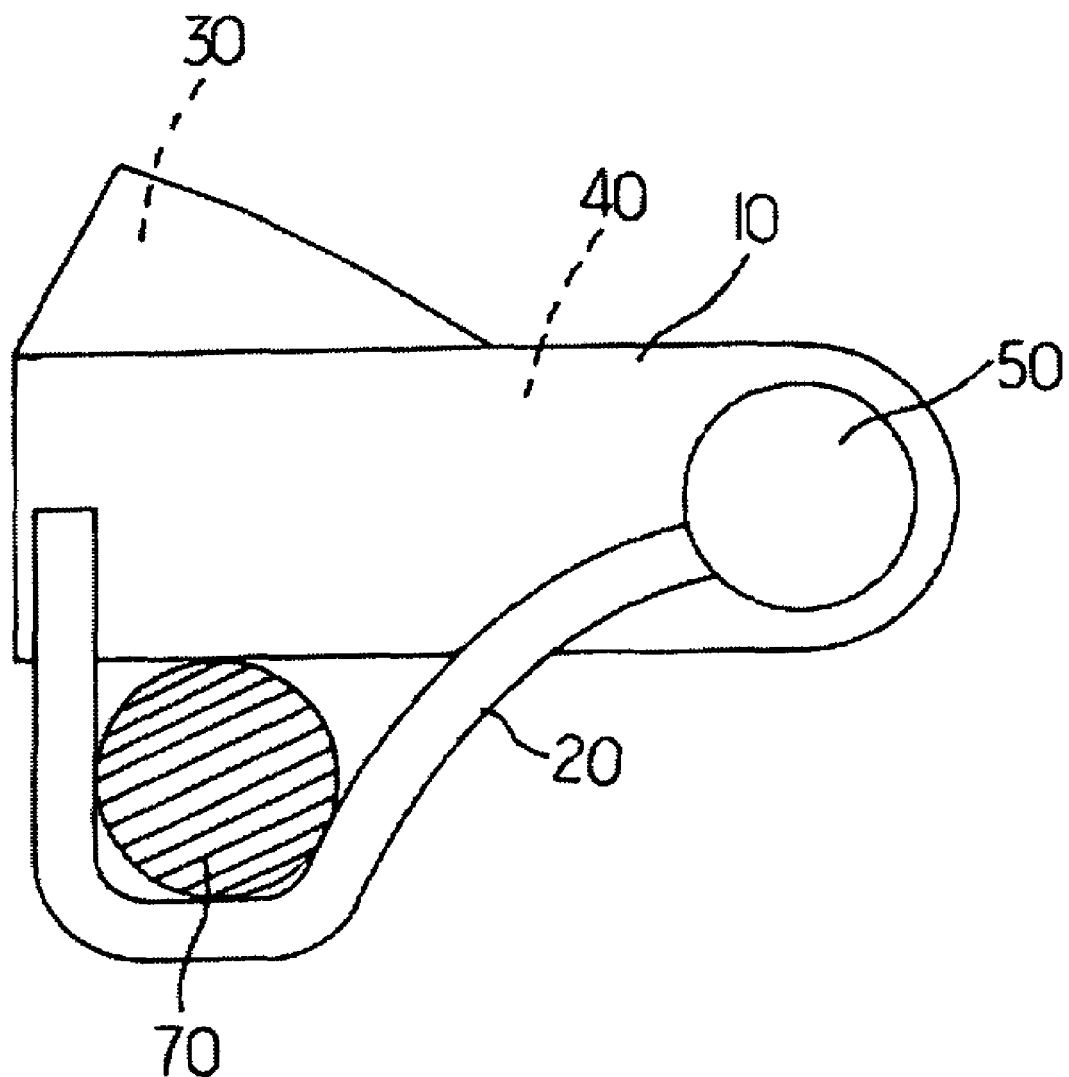
FIG. 4 is a schematic view showing that a steering wheel is locked up by the locking member in the present invention.

An adapter 11 is provided to the frame 10 to be plugged in by another IC chip 43'. The electric circuit of the adapter 11 is linked to the control circuit 40 so to integrate the IC chip 43 and the built-in IC chip 43 with the control circuit 40. The IC ship 43' maintains the data of physical features e.g., pattern of fingerprint, or pupil of the genuine driver or the motorcar owner. Accordingly, once the system is activated, the motor 50 drives the lock member 20 to an angle to restrict the steering wheel 70 as illustrated in FIG. 4. The control circuit 40 and the door opening mechanism are linked to each other so that when the door is opened, the control circuit functions as illustrated in FIG. 2(B). Wherein, the user plugs the IC chip 43' into the adapter 11 to activate the image retriever device 30 to retrieve the image recorded in the direction of the driver's seat and have the image to compare with that of the genuine driver recoded in the built-in IC chip 43.

If the results of comparison fit, the motor 50 is activated to release the locking member 20 from the steering wheel 70 for the driver to use his motorcar. On the contrary, when the comparison results do not fit, the locking member 20 maintains its status of restricting the steering wheel 70 and the image of the unauthorized driver is immediately recorded and saved in the image recording unit 44 comprised of flash memory, burner, and hard disk while the alarm is activated to notify parties concerned for taking responses in time.

Furthermore, the image taken of the burglar by the image retrieve device 30 is transmitted to the cellular phone of the car owner and/or the main frame of the security company through radio communication for the car owner or the security company to have access to the image of the burglar and the status of the door of the motorcar for coming up with proper response.

The present invention may be further incorporated with the audio prompt function to alert the driver to insert the IC chip and approach to the image retrieve device in sequence. The audio prompt function operates on independent power source supplied by a rechargeable battery to prevent from being disabled due to the circuit of the motorcar is damaged.

The prevent invention provides an improved mechanism of motorcar burglar proof system, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

I claim:

1. A motorcar burglarproof system comprising a frame having a locking member to restrict movement of a steering wheel; an image retrieve device; a built-in control circuit linked to an alarm installed to the motorcar and integrated with power supply loop, microprocessor, IC chip, image recording unit, digital image process loop, locking member driver loop, and alarm drive loop; the IC chip recording physical features of a driver for comparison with that of an image taken by the image retrieve device of an authorized driver; locking member being released from the steering wheel if the comparison results in a match between driver and the authorized driver; the locking member remaining in its status of restricting movement of the steering wheel if the comparison results fail to indicate a match between the driver and the authorized driver, whereby; the image of the driver is recorded in real time and saved; and wherein the alarm is activated to notify parties concerned to respond.

2. The motorcar burglarproof system of claim 1, wherein the control circuit is linked to a door opening mechanism, and the system is activated once the door of the motorcar is opened.

3. The motorcar burglarproof system of claim 1, wherein the control circuit is integrated with a radio communication module to transmit the image retrieved by the image retrieve device to a designated receiver.

4. The motorcar burglarproof system of claim 1, wherein the frame is provided with an adapter linked to the control circuit; the IC chip is linked to the control circuit through the adapter.

5. The motorcar burglarproof system of claim 1, wherein the image-recording unit integrated by the control circuit relates to a flash image-recording unit.

6. The motorcar burglarproof system of claim 1, wherein the image-recording unit integrated by the control circuit relates to a burner.

7. The motorcar burglarproof system of claim 1, wherein the image-recording unit integrated by the control circuit relates to a hard disk.

8. The motorcar burglarproof system of claim 1, wherein the control circuit is integrated with the motor; the motor is subject to the control by the locking member drive loop; and the motor drives the locking member to operate.

9. The motorcar burglarproof system of claim 8, wherein those two motors are respectively provided on both sides of the frame and the locking member related to a clamping member that changes its angle for being subject to the revolution of the motors.

10. The motorcar burgla proof system of claim 1, wherein the image retrieve device is related to CCD photo-sense device, CMOS photo-sense device, and digital or analog image retrieve device.

* * * * *

UNITED STATES PATENT AND TRADEMARK OFFICE
CERTIFICATE OF CORRECTION

PATENT NO.        : 7,259,659 B2
APPLICATION NO.   : 11/147283
DATED             : August 21, 2007
INVENTOR(S)       : Fu-Jen Liu It is certified that error appears in the above-identified patent and that said Letters Patent is hereby corrected as shown below:

On the title page, item (73) should read as follows:

--(73) Assignee:  Hung-Pin LIU, Taipei City (TW); Kun-Cheng LIN, Keelung City (TW)--

Signed and Sealed this

Thirteenth Day of November, 2007

JON W. DUDAS
*Director of the United States Patent and Trademark Office*